(12) United States Patent
Bangalore et al.

(10) Patent No.: US 9,817,380 B2
(45) Date of Patent: Nov. 14, 2017

(54) SYSTEMS AND METHODS FOR SITE-BASED IRRIGATION CONTROL

(71) Applicant: Telsco Industries, Inc., Garland, TX (US)

(72) Inventors: Venkataramu L. Bangalore, Plano, TX (US); William C. Savelle, Jr., McKinney, TX (US); Lex M. Mason, Sr., Dallas, TX (US)

(73) Assignee: Telsco Industries, Inc., Garland, TX (US)

( * ) Notice: Subject to any disclaimer, the term of this patent is extended or adjusted under 35 U.S.C. 154(b) by 254 days.

(21) Appl. No.: 14/641,044

(22) Filed: Mar. 6, 2015

(65) Prior Publication Data

US 2016/0259309 A1  Sep. 8, 2016

(51) Int. Cl.
*G05B 19/04* (2006.01)
*A01G 25/16* (2006.01)

(52) U.S. Cl.
CPC ............. *G05B 19/04* (2013.01); *A01G 25/16* (2013.01); *G05B 2219/2625* (2013.01)

(58) Field of Classification Search
CPC . G05B 19/04; G05B 2219/2625; A01G 25/02
USPC ........................................................ 700/284
See application file for complete search history.

(56) References Cited

U.S. PATENT DOCUMENTS

| | | |
|---|---|---|
| 6,314,340 B1 | 11/2001 | Mecham et al. |
| 7,010,396 B2 | 3/2006 | Ware et al. |
| 7,596,429 B2 | 9/2009 | Cardinal et al. |
| 7,930,069 B2 | 4/2011 | Savelle, Jr. et al. |
| 8,494,683 B2 | 7/2013 | Piper et al. |
| 2009/0138105 A1 | 5/2009 | Crawford |
| 2010/0042263 A1* | 2/2010 | Jacobsen ............... A01G 25/16 700/284 |
| 2012/0072036 A1* | 3/2012 | Piper ..................... A01G 25/16 700/284 |

(Continued)

OTHER PUBLICATIONS

ETwater, *Complete Line of Smart Irrigation Solutions & Products*, accessed Mar. 6, 2015, http://etwater.com/complete-line-smart-irrigation-solutions-products, 14 pages.

(Continued)

*Primary Examiner* — Vincent Tran
(74) *Attorney, Agent, or Firm* — Haynes and Boone, LLP

(57) ABSTRACT

An irrigation system is contained at a particular site, where the site may be a commercial address or a residential address. The system includes a weather station that generates temperature data, precipitation data, and any other useful data that might be used by other components of the system. The system also includes an irrigation controller that uses electrical signals to open and close valves, thereby turning sprinklers on and off, whether zone-by-zone or sprinkler-by-sprinkler. The system further includes a host device which communicates with the weather station and with the irrigation controller. The host device includes a computer processor and one or more wireless interfaces. The host device receives the weather data from the weather station and calculates an amount of desired irrigation, generating an irrigation schedule. The host device then controls the irrigation controller according to the generated irrigation schedule.

19 Claims, 3 Drawing Sheets

(56) References Cited

U.S. PATENT DOCUMENTS

| | | | |
|---|---|---|---|
| 2012/0221154 A1* | 8/2012 | Runge | A01G 25/16 700/284 |
| 2012/0303268 A1 | 11/2012 | Su et al. | |
| 2013/0269798 A1* | 10/2013 | Wood | A01G 25/167 137/551 |
| 2013/0310992 A1* | 11/2013 | Larsen | A01G 25/16 700/284 |
| 2014/0031996 A1* | 1/2014 | Nickerson | A01G 25/16 700/284 |
| 2014/0129039 A1* | 5/2014 | Olive-Chahinian | A01G 25/16 700/284 |
| 2015/0057817 A1* | 2/2015 | Endrizzi | A01G 25/165 700/284 |

OTHER PUBLICATIONS

Weathermatic.com, *Our Products*, accessed Mar. 6, 2015, http://www.weathermatic.com/our-products, 46 pgs.

\* cited by examiner

SYSTEMS AND METHODS FOR SITE-BASED IRRIGATION CONTROL

TECHNICAL FIELD

This application relates to irrigation systems and, more specifically, to irrigation systems having site-based generation of irrigation control schedules.

BACKGROUND

Automatic sprinkling systems are well known in the art. These systems typically operate in a manner where the user specifies a certain time for starting a watering cycle as well as a length of time that each specified watering cycle (in perhaps each of a number of watering zones) should last. In most situations, the user makes an initial best guess as to the watering needs of the vegetation, and sets a watering time based on that guess. Thereafter, the user monitors the health of the plants and condition of the soil in each watering zone to make adjustments to the initial guess as to watering needs and causing corresponding adjustments to the specified watering time for each zone. Ideally, an automatic sprinkler system should return to the vegetation only as much water as has been lost through either evaporation from the soil or transpiration from the plant. This manual guessing process for specifying sprinkling durations is notoriously inaccurate. In fact, some estimates indicate that automatic sprinkler users over-water their vegetation by as much as a thirty to forty percent (30-40%) factor.

The term "evapotranspiration" (ET) refers to the amount of water a plant uses or needs in order to maintain growth. The climatic information commonly used to calculate an evapotranspiration value include temperature, solar radiation, wind speed, and vapor pressure or humidity. This climatic information is generally collected by a full service weather station and processed in one of a number of known complex formulas or equations to calculate the evapotranspiration value. One example of such an equation recognized in the agriculture industry for accuracy in measuring evapotranspiration using weather station collected climatic information is the well-known Penman-Monteith or modified Penman equations (hereafter referred to as "modified Penmans").

Considerable effort has accordingly been expended in developing evapotranspiration formulas which mimic the results provided by the weather station climatic information driven (e.g., Penman-Monteith, modified Penmans) equations, but do not require access to such large amounts of specific weather station collected climatic information. More specifically, there is a need for an accurate evapotranspiration formula which requires for its input data climatic information that is easily and inexpensively collectable at the specific site where the vegetation at issue is located. One such formulation comprises the Hargreaves equation as set forth below:

wherein:

$$ET_0 = 0.00009 \times RA \times (T^\circ C. + 17.8) \times TD^{0.50}$$

$ET_0$=reference evapotranspiration (in inches of water per day); and

RA=extraterrestrial radiation expressed in equivalent evaporation (in inches of water per day);

and further wherein:

$T^\circ C.$ = average daily temperature

= $(T\max + T\min)/2$; and $TD$ = daily temperature differential

= $T\max - T\min$

Hargreaves techniques have been improved upon by some conventional systems that collect daily high and low temperature data at the site of an irrigation controller. This temperature data is then processed, along with extraterrestrial radiation influenced equivalent evaporation data, in accordance with the Hargreaves equation, to determine a reference evapotranspiration value which represents an estimation of the current watering needs of a certain reference vegetation at the site. The reference evapotranspiration value is then adjusted by a local deviation factor specific to the site which affects evapotranspiration rates to generate an adjusted evapotranspiration value. More particularly, this local deviation factor accounts for any deviation between actual evapotranspiration or weather station climatic information driven evapotranspiration and the Hargreaves equation calculated evapotranspiration, and thus adjusts for localized errors in the application of the Hargreaves equation. The locally adjusted evapotranspiration value is then further adjusted, for example, to account for the type of vegetation at the site to generate a net evapotranspiration value representing an estimation of the current watering needs for the specific plants at that specific site. The net evapotranspiration value is then divided by a sprinkler head average precipitation rate to determine a run time for irrigation. The controller then irrigates the site for the duration of the determined run time necessary to satisfy the watering needs of the vegetation. Of course, the Hargreaves equation is only one technique that can be used to generate irrigation schedules.

Some conventional systems use a distributed architecture to control irrigation. One conventional example includes a system having a controller that actuates valves at one or more irrigation sites. The controller is in communication with a central server over, e.g., the Internet, where the central server calculates irrigation schedules using weather data and sends those irrigation schedules to the controller. The controller saves received irrigation schedules and opens and closes the irrigation valves according to the received irrigation schedules. However, such a solution may not be adequate for some users. For instance, if the communication link is broken between the controller and the central server, then the controller might not operate optimally. Also, such conventional system may rely on weather data generated off-site, which may be less reliable than weather data generated on-site.

SUMMARY

Systems and methods for irrigation are described below. In one example embodiment, a system is contained at a particular site, where the site may be a commercial address or a residential address. The system includes a weather station that generates temperature data, precipitation data, and any other useful data that might be used by other components of the system. The system also includes an irrigation controller that uses electrical signals to open and close valves, thereby turning sprinklers on and off, whether zone-by-zone or sprinkler-by-sprinkler. The system further includes a host device which communicates with the weather station and with the irrigation controller. The host device includes a computer processor and one or more wireless interfaces. The host device receives the weather data from the weather station and calculates an amount of desired irrigation, generating an irrigation schedule. The host device then controls the irrigation controller according to the generated irrigation schedule.

Further in this example, the host device may act as a retrofit solution to provide more sophisticated irrigation than would be provided by the irrigation controller itself. Conventional irrigation controllers often include proprietary wired interfaces through which signals may be received to control opening and closing of irrigation valves. Accordingly, the host device may include a connection wire corresponding to the proprietary wired interface of the controller, thereby allowing the host device to remotely control the irrigation controller. Therefore, a consumer may install the host device and the weather station on-site, and connect the host device to a remote control interface of an existing irrigation controller. The consumer may then use the host device to generate and implement irrigation schedules.

Continuing with the example above, the host device may include a wireless interface for communicating with a central server that is off-site. For example, the wireless interface may include a 3G or 4G cellular transceiver that is operable to communicate with cellular base station towers to pass information back and forth with a central server. The central server may provide a number of functions, such as advanced user interface functions for the consumer, as well as providing data useful for generating irrigation schedules.

Other embodiments may include methods for use with the irrigation system described above. One example method may include the host device receiving weather data from the weather station, either by a wired interface or a wireless interface. The host device includes a computer processor that generates an irrigation schedule using the weather data. The host device then remotely controls an irrigation controller to carry out irrigation according to the irrigation schedule.

DETAILED DESCRIPTION

Example System Embodiments

Figure 1:
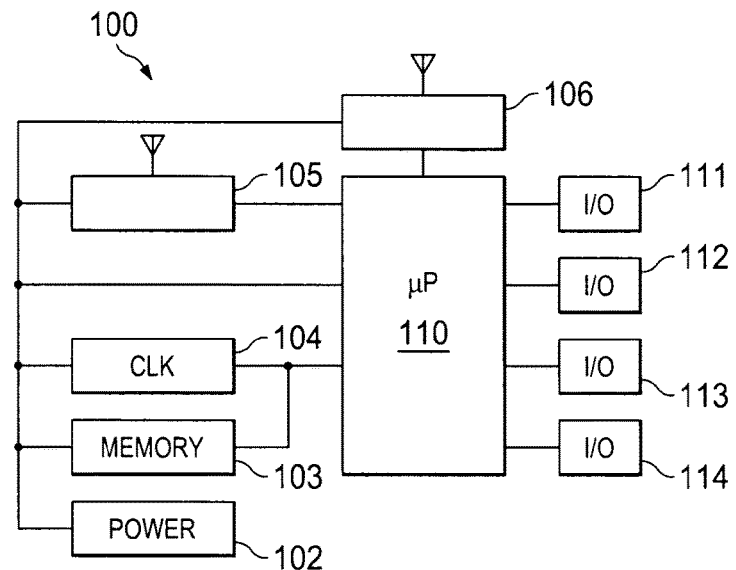
FIG. 1 illustrates an example host device for controlling irrigation at a site, in accordance with an embodiment of the disclosure.

FIG. 1 is an architectural diagram illustrating an example host device, according to one embodiment. The host device 100 includes microprocessor (CPU) 110 a memory 103 including a programmable read only memory (ROM/PROM) portion and a random access memory (RAM) portion. The memory 103 provides a non-volatile storage location for the programming code of the host device along with certain data necessary for execution of the code. The memory 103 provides a volatile storage location for certain (variable/temporary) data generated during execution of the programming code. The microprocessor 110 communicates with the memory 103 in a conventional manner utilizing an address bus and a data bus (not shown). It will be understood that the memory 103 may be incorporated integrally within, or provided separate and apart from, the microprocessor 110.

Figure 2:
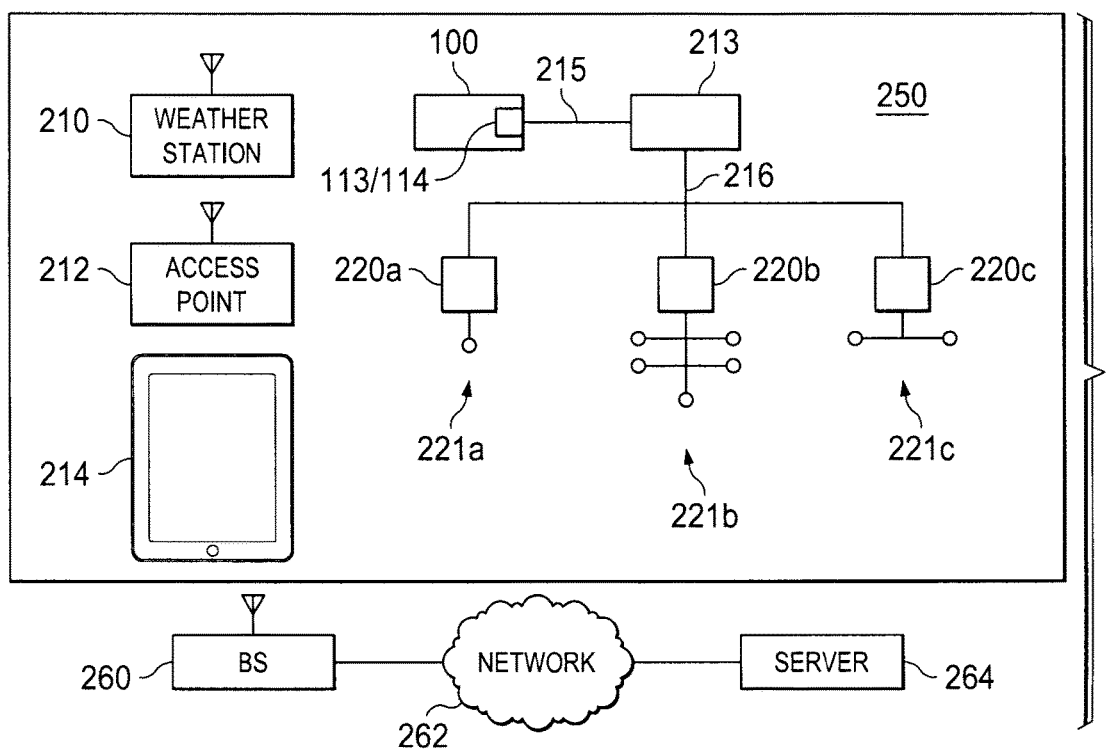
FIG. 2 illustrates an example installation of an irrigation system, in accordance with an embodiment of the disclosure.

Host device 100 also includes wireless communication device 105 for communicating with a weather station, where an example weather station is described in more detail with respect to FIG. 2. In this example, wireless communication device 105 includes a 900 MHz transceiver with an antenna, where 900 MHz is desirable for many on-site deployments because of the relative quality of the signal compared with other parts of the radio spectrum. However, the scope of embodiments is not limited to use of 900 MHz only, as other examples may use for instance 2.4 GHz or other available bands.

Wireless communication device 105 provides an interface with the weather station, where the weather station provides weather data to be stored in memory 103 and processed by microprocessor 110. In one example, in response to instruction by microprocessor 110, wireless device 105 polls the weather station and in response receives weather data transmitted from the weather station. Wireless device 105 is a communication device which passes the received data to microprocessor 110, which then stores the data to memory 103 for later use.

One type of weather data that may be received from the weather station includes temperature data. In accordance with the operation of the programming code, temperature data collected by the weather station is passed through the wireless device 105 at the request of the microprocessor 110 and stored by memory 103. The temperature data is then subsequently retrieved from the memory 103 by microprocessor 110 and processed by the microprocessor 110 in accordance with the execution of the programming code to determine an amount of water to be applied to replace water lost through the effects of evapotranspiration.

Host device 100 also includes wireless device 106, which in this example provides for data communication over any of a plurality of different protocols, including 3G and 4G cellular data, Wi-Fi (IEEE 802.11), and the like. In one example, wireless device 106 is a cellular data transceiver, and it communicates with a cellular base station (not shown), which provides a connection to a central server (also not shown). Additionally or alternatively, wireless device 106 may also include a Wi-Fi transceiver for communicating with a local access point, which provides an Internet connection to the central server. In any event, host device 100 includes a connection to a central server that provides data management and an advanced user interface in this example embodiment.

Further in this example, a consumer or a site manager may have a smart phone, tablet computer, or other appropriate computing device that includes an application ("app") providing a user interface for host device 100. In general, applications are computer software programs designed to execute specific tasks. As examples, both Apple's® App Store and Google's® Android Market offer a multitude of applications, including entertainment programs, business programs, file management tools, and other widgets, etc. The user interface of the application communicates with the central server, which applies any changes or data entry to the host device 100 over the air using wireless device 106. In other words, in this example the user interface application communicates over the Internet with a central server, and the central server communicates with host device 100 via wireless device 106. An example user interface is described more fully below with respect to FIG. 3.

Input data may, in some instances, be stored in the memory 103 by microprocessor 110. The kinds of data input into the host device 100 may include, for example: a preferred time of day when irrigation is to be effectuated; a preferred day (or days) of the week when irrigation is to be effectuated; an identification of soil type for the irrigated area; an identification of the vegetation type (crop coefficient); site latitude; sprinkler flow rates; and, a local irrigation adjustment factor. The user interface may further be utilized to initiate certain host device 100 activities (such as, for example, an irrigation operation, a self test, or the like) without regard to the current state of programming code execution.

Host device 100 further includes input output port 111, which may be connected by wire to one or more sensors that affect irrigation. An example of such a sensor is a moisture sensor. When the moisture sensor detects moisture, this is indicative of a rainfall event. During such a rainfall event, a signal is passed through the port 111, and the microprocessor 110 responds thereto by temporarily suppressing controller actuation to sprinkle. Another example of such a sensor is a rainfall gauge. Using rainfall information collected by the rainfall gauge sensor and passed through the port 111, the microprocessor 110 adjusts (e.g., reduces) its programming code calculated irrigation amount of water which needs to be applied to replace water lost through the effects of evapotranspiration. Another example of such a sensor is a freeze sensor, which detects a freeze and prevents host device 110 from causing a controller to actuate sprinkler valves. Additionally or alternatively, such sensors may be integrated with the weather station, wherein such sensor data would be received by host device 110 via wireless device 105.

A serial communications port 112 is connected to (or is incorporated in) the microprocessor 110 to support communications between the host device 100 and external devices such as a personal/laptop computer (not shown). Through this serial port 112, the programming code (and data) stored in the memory 103 may be updated and data may be extracted from or downloaded to the memory 103. As an example, a table of extraterrestrial radiation influenced equivalent evaporation data for each month/day of the year at a plurality of latitudes may be downloaded into the memory 103 through the serial port 112. The serial port 112 further allows a technician to have access to the microprocessor 110 for the purpose of performing diagnostic and maintenance operations on the host device 100.

A time of day clock 104 is connected to the microprocessor 110 through the address bus and data bus. This clock 104 maintains a non-volatile record of month, day, hour of the day, minutes of the hour and seconds of the minute. The clock 104 generates an output time data that is monitored by the microprocessor 110 with the time data driving certain operations in accordance with the programming code. These operations include: reading and storing temperature data; initiating and stopping irrigation activities; and, performing certain irrigation related calculations.

Input and output ports 113 and 114 are in communication with microprocessor 110, and allow host device 100 to send signals to an external irrigation controller (not shown) to cause that external irrigation controller to actuate irrigation valves. In this example, input output port 113 is a generalized port that may include any appropriate physical connector. Various embodiments described herein may be used as a retrofit solution, allowing host device 100 to send signals to existing external irrigation controllers. Conventional external irrigation controllers, available from a variety of different suppliers, may include any of a multitude of proprietary physical interfaces for receiving remote control signals. For example, one conventional external irrigation controller supplier may implement a three-pronged wire input, whereas another supplier of conventional irrigation controllers may implement a four-pronged wire input. In any event, it is understood that host device 100 may be included with a plurality of adapters, for interfacing input output port 113 with a plurality of different proprietary remote control inputs of different irrigation controllers.

Therefore, the physical configuration of input output port 113 may be dependent upon the minimal number of output signals needed to service a remote control input having a maximum number of input signals. Input output port 114 in this example conforms to the well-known Modbus protocol. Microprocessor 110 may use either or both of ports 113 and 114 to remotely control an external irrigation controller.

It is also understood that suppliers of different irrigation controllers may use different remote control signals to allow an external device (such as host device 100) to control the irrigation controller to open and close appropriate valves at appropriate times. Accordingly, memory 103 may store instructions allowing it to communicate appropriately with any of a number of irrigation controllers. For instance, if one conventional irrigation controller uses a first communication protocol for remote control, and if another conventional irrigation controller uses a second communication protocol for remote control, memory 103 may be pre-programmed to conform to those protocols, thereby allowing host device 100 to cause either of those controllers to actuate irrigation valves appropriately.

Power controller 102 receives power from a source (e.g., 120 V AC) and converts it into power that is appropriate for microprocessor 110 and wireless devices 105 at 106. Microprocessor 110 may be implemented using any appropriate logic circuits. For example, microprocessor 110 may include a general purpose Central Processing Unit (CPU), a Digital Signal Processor (DSP), an Application Specific Integrated Circuit (ASIC), a Field Programmable Gate Array (FPGA), and or the like that is operable to execute computer code to perform the actions described herein. For instance, the computer-executable code may be stored to memory 103, where microprocessor 110 reads that code and executes it upon start up. As a result of executing the code, the microprocessor 110 generates irrigation schedules and provides remote control signals to cause a controller to actuate irrigation valves.

In accordance with the execution of the programming code, the microprocessor 110 outputs irrigation control signals through the I/O interfaces 113 and or 114 to control the actuation of irrigation control valves (not shown). These control valves operate to either allow or block the passage of water to one or more sprinkler heads. In one example, each control valve is associated with a particular sprinkler or irrigation zone, where a given site may include one or more zones that are independently controlled and have their own respective irrigation schedules. The length of time each irrigation control valve (i.e., zone) is actuated to allow the passage of water is calculated by the microprocessor 110 in accordance with the execution of the programming code.

The daily temperature data of importance to the Hargreaves equation (high, low and differential) is calculated by the microprocessor 110 from the temperature information collected by the weather station and stored in the memory 103. The latitude of the controller site is input by the user into the memory 103 using, for example, a user interface that communicates through a central server and through wireless device 105. Using this latitude data, date (month or day) sensitive equivalent evaporation data of importance to the Hargreaves equation is determined from a latitude based extraterrestrial radiation table stored in the memory 103. The microcontroller 110 then determines a reference evapotranspiration value from the Hargreaves equation (and is perhaps summed over a plurality of days since a last irrigation) at instances when an irrigation event occurs.

Microcontroller 110 then adjusts the reference evapotranspiration value by a local adjustment coefficient to account for presumed average variation between the Hargreaves equation calculated watering needs and either (1) actual watering needs or (2) Penman-Monteith, modified Penmans or other similar evapotranspiration equation calculated watering needs. The local adjustment coefficient is estimated and input by the user or by the central server and saved to the memory 103. The value of this local adjustment coefficient is affected by factors such as site altitude, site shade conditions, local weather patterns and characteristics (humidity, aridity and the like), drainage and topology.

The microcontroller 110 then adjusts the locally adjusted evapotranspiration value by the crop coefficient to account for the specific type of vegetation being sprinkled. The crop coefficient is input by the user into the memory 103 using, for instance, a user interface in communication with a central server. Next, the microcontroller 110 further adjusts the crop adjusted evapotranspiration value to account for any measured rainfall since the last irrigation. The microcontroller then divides the rainfall adjusted evapotranspiration value by the average precipitation rate for the sprinkler heads to determine run time for the actuation of each irrigation control valve. This average precipitation rate information is input by the user into the memory 103 by, for instance, the user interface in communication with a central server. The host device 100 then actuates each irrigation control valve by sending remote control signals to the irrigation controller, thereby causing the irrigation controller to open and close the valves as appropriate according to the specified run time.

FIG. 2 is a block diagram illustration of a deployed system, according to one embodiment. The deployed system shows host device 100 communicatively connected to irrigation controller 213 by input output ports 113/114. In this example, host device 100 may be embodied using a Printed Circuit Board (PCB) having the electronic components shown in FIG. 1 mounted thereon, with the PCB disposed within a ruggedized housing. The scope of embodiments is not limited to any specific housing, although a relatively rigid housing made of polyvinyl chloride (PVC) or other suitable plastic may be appropriate in some installations. Input output ports 113/114 are exposed externally to the housing, facilitating a wired connection 215 between host device 100 and controller 213.

Similarly to host device 100, irrigation controller 213 may also be implemented using a PCB for internal electronics disposed within a ruggedized housing. The scope of embodiments is not limited to any specific housing for the irrigation controller 213, although in many instances a housing similar to that used for host device 100 may be appropriate. It is noted that host device 100 and irrigation controller 213 are separate devices and embodied in separate housings. Specifically, in this embodiment, host device 100 is a retrofit device that is in communication with a remote control input port (not shown) of irrigation controller 213 via wired interface 215, thereby allowing host device 100 to send remote control signals to irrigation controller 213. In this manner, host device 100 provides control for the irrigation system using previously-installed irrigation controller 213.

Further in this example, irrigation controller 213 is installed at site 250, perhaps mounted by brackets to a wall or using other suitable mounting technique. Irrigation controller 213 has wired interface 216 to irrigation valves 220. During operation, irrigation controller 213 provides electrical signals to a selected one of the irrigation valves 220, thereby activating that valve to cause water to erupt from its corresponding sprinkler heads 221.

Continuing with the example, each of the irrigation valves 220 corresponds to an irrigation zone of site 250. Host device 100 has a generated irrigation schedule, which specifies a watering time and watering duration for each of the three zones of site 250. For purposes of this illustration, assume that valve 220A corresponds to Zone 1, irrigation valves 220B corresponds to Zone 2, and irrigation valve 220C corresponds to Zone 3. Host device 100 sends remote control signals to irrigation controller 213, thereby causing irrigation controller 213 to actuate valves 220 zone-by-zone according to the irrigation schedule. Host device 100 executes program code to cause it to read a generated irrigation schedule from its memory and to apply that schedule to the zones.

In the example of FIG. 2, host device 100 sends remote control signals to irrigation controller 213 to cause irrigation controller 213 to apply electrical signals to open and close irrigation valve 220A at appropriate times and for appropriate lengths of time, according to the irrigation schedule. Similarly, host device 100 causes irrigation controller 213 to apply electrical signals to open and close irrigation valve 220B according to the irrigation schedule; host device 100 also causes irrigation controller 213 to apply electrical signals to open and close irrigation valve 220C according to the irrigation schedule as well. In other words, host device 100 controls irrigation controller 213 to implement the irrigation schedule zone-by-zone so that each zone is treated independently.

The example of FIG. 2 shows only three zones at site 250, but the scope of embodiments is not limited to only three zones. The system shown in FIG. 2 may be scaled to any appropriate number of zones for site 250. Additionally or alternatively, the system shown in FIG. 2 may control individual sprinkler heads 221, assuming that such individual sprinkler heads may be individually actuated by electrical signals from irrigation controller 213.

Further at site 250, there is weather station 210, which operates as described above. Weather station 210 may be mounted, for instance, in an area where it may receive sunlight, wind, and precipitation so that it provides accurate weather data. As noted above, weather station 210 communicates wirelessly with host device 100 to pass weather data from weather station 210 for processing and storage at host device 100. For instance, some embodiments may use a 900 MHz wireless connection for communications between weather station 210 and host device 100. While weather station 210 is shown communicating wirelessly, it is within the scope of embodiments that a wired connection may be made in addition to or instead of a wireless connection. It is noted that weather station 210 is included at the same site as host device 100 and irrigation controller 213. Thus, host device 100 generates an irrigation schedule using weather data gathered on-site and performs the processing to generate the irrigation schedule on-site.

Site 250 also includes wireless access point 212, which may include a IEEE 802.11 (Wi-Fi) access point or other appropriate access point capable of communicating wirelessly with weather station 210, host device 100, and mobile computing device 214. For example, a wireless access point 212 may provide a wireless Internet connection available for use by other wireless communicating devices and may also act as a communications switch, routing communications between wireless communicating devices. In one example method of communication, host device 100 communicates wirelessly with weather station 210 using access point 212 as a communications switch. In another example method of communication, host device 100 communicates with a central server 264 using a wireless Internet connection provided by wireless access point 212.

In some embodiments, the algorithm used to calculate irrigation schedules is affected by boundary conditions of site 250. Examples of boundary conditions include, e.g., soil type, sprinkler head type, vegetation type, latitude of site, and/or any other relevant factor. A technique to enter such information into the memory at host device 100 includes using a graphical user interface application at mobile computing device 214. In such a technique, a user may open the application operating on mobile device 214 and access an interface configured to receive information regarding boundary conditions. The user enters information into the interface, thereby causing the information to be sent to central server 264 via wireless access point 212 and network 262 (e.g., the Internet).

Figure 3:
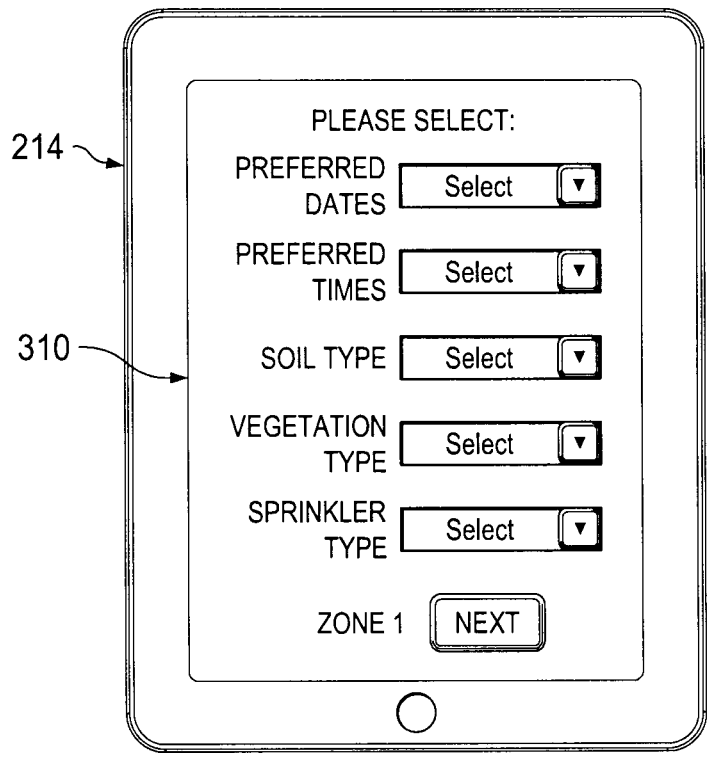
FIG. 3 illustrates an example graphical user interface on a mobile computing device configured to allow a user to enter configuration information to the irrigation system, in accordance with an embodiment of the disclosure.

An example graphical user interface for use at mobile computing device 214, according to one embodiment, is illustrated in FIG. 3. Mobile computing device 214 may include any appropriate mobile computing device, including a smart phone, a tablet computer, a laptop computer, and/or the like. In fact, it is within the scope of embodiments that the application may be executed on a desktop computer or other device as appropriate. Mobile computing device 214 includes a microprocessor (not shown) that reads executable instructions from a computer-readable medium and executes those instructions to provide the functionality of the application. As shown in FIG. 3, the application includes an example interface 310, which has pull-down menus where a user can enter or choose preferred dates, preferred times, soil type, vegetation type, and sprinkler type for Zone 1. It is understood that interface 310 provides similar techniques for entry of boundary conditions for other zones as well.

Of course, interface 310 of FIG. 3 is an example, and the scope of embodiments is not limited to any particular graphical user interface for entering boundary conditions. Other embodiments include an interface built into host device 100, such as a touchscreen interface, allowing a user to enter boundary conditions directly into host device 100 rather than through a separate device such as mobile computing device 214. In another example, device 2148 interface with host device 100 via port 111 or wireless device 105 to directly enter data.

Returning to FIG. 2, base station 260 is located away from site 250. Base station 260 includes a cellular data base station, such as a 3G or 4G base station, or other appropriate base station. The scope of embodiments is not limited to any particular communications technology for base station 260, so other data transmissions protocols now known or later developed, including 5G wireless access, may be supported by base station 260. In the embodiment of FIG. 2, base station 260 is used to transmit data between host device 100 and central server 264. Thus, while the example above provides an illustration of Internet access using wireless access point 212, the embodiment further provides for data communications via base station 260. An example method of use includes a user entering boundary conditions using mobile computing device 214, where its boundary conditions are received through network 262 at server 264. Central server 264 then sends that data to host device 100 using a cellular data protocol, such as 3G or 4G, as facilitated by a wireless communication device (such as transceiver 105 of FIG. 1) at host device 100.

The application executed by mobile computing device 214 may be used to control various functionality of host device 100. As noted above, a user can enter boundary conditions using the application, where its boundary conditions are downloaded to host device 100 using either wireless access point 212 or base station 260. Various embodiments also include additional control functionality, such as allowing a human user to test sprinklers and valves in various zones, to access diagnostic information, or to access historic weather data using the application as well. Such additional functionality may be provided by central server 264, which stores diagnostic information and historic weather and historic operational data. In some embodiments, central server 264 includes one or more databases of operational and weather data for a variety of sites, including site 250, and making that data available to users of applications at a variety of different mobile devices and at a variety of different sites.

Further in this embodiment, host device 100 reports to central server 264 every day or at other appropriate time periods so that central server 264 includes a comprehensive record of operational and weather data at site 250. Host device has a bitmap memory (included in memory 103 of FIG. 1) that stores operational and weather data as well as boundary conditions and updates that information as appropriate. But rather than reporting the entire contents of the bitmap memory at every reporting period, host device 100 in some examples reports only those portions in its bitmap memory that have changed since the previous reporting period.

Continuing with the example, host device 100 stores dates and times for irrigation, runtimes for irrigation, high and low temperatures for a day, accrued water deficit, boundary conditions, and other pertinent information affecting the entire site 250 or individual zones. Host device 100 also stores metadata indicating which portions of the bitmap memory have changed since the previous reporting period. At each reporting period, host device 100 checks the metadata for information in the memory that has changed and reports that changed data to central server 264 using either a cellular data connection via base station 260 or a wireless Internet connection at access point 212.

For example, each day a high and a low temperature may have changed, and those high and low temperature portions of the bitmap memory may be reported at a given reporting period. However, data that has not changed (e.g., soil type or vegetation type) is not reported. Such selective reporting is advantageous in some embodiments because it reduces the amount of data that is sent from host device 100 to server 264. Since some cellular data agreements charge by amount of data that is transferred or include caps on data that may be transferred at a certain price, reducing the amount of data sent may reduce operating cost of the system at site 250.

Various embodiments may include advantages over conventional solutions. For instance, the embodiment of FIG. 2 calculates irrigation schedules on-site using weather data generated on-site. Therefore, even if a communication connection with the central server 264 becomes temporarily unavailable, host device 100 can continue to receive relevant weather data and calculate appropriate irrigation schedules even as weather conditions change. By contrast, a conventional system that calculates irrigation schedules only at a server has less utility when the connection to the server is unavailable.

Also, the use of an on-site weather station provides weather data relevant to that site with a precision that may not be available with wider area-based weather reports. Weather phenomena can be relatively localized, where for example sites along one side of a street may receive substantially more rainfall in a single event than similar sites directly across that street. Accordingly, area-based weather services having as few as one weather station (or fewer) per square mile may provide relevant weather data but may not provide precise weather data that accounts for the local nature of weather phenomena. By contrast, the embodiment of FIG. 2 may provide weather data for a given site for use at that given site to calculate an irrigation schedule tailored to a particular irrigation deficit experienced at that site. Furthermore, other embodiments may include more than one weather station per-site, such as one weather station per-zone, thereby providing even greater precision in calculation of irrigation schedules.

Sites 250 of FIG. 2 may include any of a variety of localized areas. An example of a site includes a residential address, an elementary school campus encompassing the city block, a commercial facility having a shopping center or a big-box store. Larger sites, such as college campuses or multiple-acre commercial establishments may be divided into smaller sites and may include multiple weather stations and or multiple host devices. In some examples, a site is under control of a single manager responsible for irrigation, in contrast to a large residential area with multiple homeowners or a commercial district with a variety of commercial owners and tenants. In many instances, a site is smaller in land area than a comparable area covered by a commercial weather service having a small number of weather stations in a given square mile.

Figure 6:
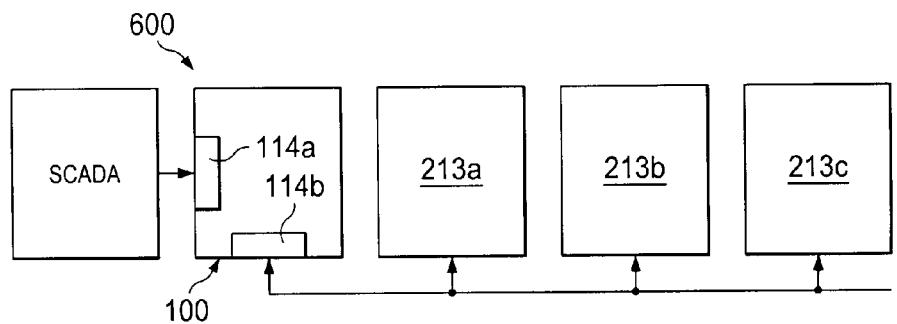
FIG. 6 illustrates an example installation of an irrigation system, according to one embodiment.

It was mentioned above that input output port 114 may conform to the well-known Modbus protocol. FIG. 6 is an illustration of an example system 600 employing the Modbus protocol, according to one embodiment. In this example, input output port 114 is configured as two input output ports. A first input output port of port 114 (hereinafter referred to as port 114*a*) is configured as a slave interface for communication with a Supervisory Control and Data Acquisition (SCADA) unit 610, Operator Interface Terminals (not shown), or any other master. Thus, the SCADA 610 is able to access the host device 100 and any devices connected as slave devices to the host device 100. The second input output port of port 114 (hereinafter referred to as port 114*b*) is configured as a master interface for communicating with the devices connected as slave devices to the host device 100.

In this example, input output port 114*a* is configured as an isolated RS-485 Modbus Remote Terminal Unit (RTU) or other appropriate interface, where host 100 can be connected as a slave device with respect to SCADA 610 or other master device. Further in this example, input output port 114*b* is connected as an isolated RS-485 Modbus RTU master interface or other appropriate interface to allow host device 100 to control its slave devices. Such an embodiment may be used to adapt host device 100 to use at a large site, where multiple irrigation controllers 213*a-c* are connected as slaves to the host device 100. The host device 100 calculates irrigation schedules and controls the multiple irrigation controllers 213*a-c* using the Modbus protocol via port 114*b*. The SCADA 610 can be used to provide a master interface for the host device 100 to communicate with a human user and to receive relevant data, such as plant types and sprinkler head types for a variety of different zones controlled by the external irrigation controllers.

An aspect an advantage of this embodiment is that the host device 100 may be provided as a retrofit device to an existing and conventional Modbus-controlled irrigation system. Specifically, the host device 100 may be interfaced with existing Modbus-compliant irrigation controllers, and an existing SCADA may be reprogrammed to communicate with the host device 100. However, other embodiments may be more than a retrofit solution, including installing a new SCADA and irrigation controllers. An advantage that may be provided by some Modbus-compliant embodiments is that the host device 100 may be used as a master to communicate with a multitude of irrigation controllers at a larger-sized site.

Example Method Embodiments

Figure 4:
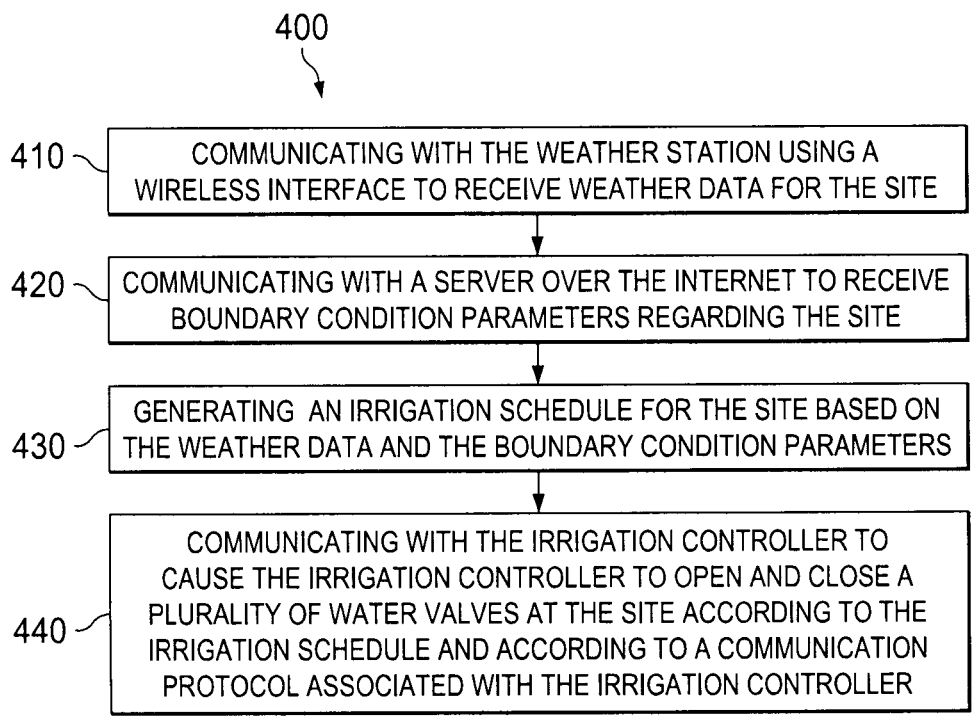
FIG. 4 illustrates an example method performed by a host device in an irrigation system, according to an embodiment of the disclosure.

A flow diagram of an example method 400 of operating a host device, such as host device 100 of FIGS. 1 and 2, is illustrated in FIG. 4. In one example, method 400 is performed by a microprocessor of a host device, which executes computer program code to generate and implement irrigation schedules at a site.

At action 410, the host device communicates with the weather station using a wireless interface to receive weather data for the site. In this example, the weather station and the host device are located at a site, which is the same site for which the host device calculates irrigation schedules.

An example is shown with respect to FIG. 1, where host device 100 uses wireless communication device 105 to communicate with an on-site weather station to receive weather data for the site. In other embodiments, a wired interface rather than a wireless interface may be used to communicate weather data from the weather station to the host device. Examples of weather data include, but are not limited to, high and low temperature for a day, amount of precipitation, amount of solar radiation, a freeze alert, and a rain since alert.

At action 420, the host device communicates with a server over the Internet to receive boundary condition parameters regarding the site. An example is illustrated with respect to FIGS. 2 and 3, where host device 100 communicates with central server 264 either over a cellular data connection via base station 260 or via wireless access point 212. The central server 264 has those boundary condition parameters saved to its memory, and it transmits those boundary condition parameters to the host device 100 as a push or pull operation.

In this embodiment, boundary condition parameters include digital data having values indicative of certain conditions at the zones of the site. Examples of boundary conditions include, but are not limited to, the vegetation type, soil type, preferred dates and times for irrigation, sprinkler types, and the like. Boundary condition parameters in such examples include digital data indicative of the values of those boundary conditions.

At action 430, the host device uses its computer processor to generate an irrigation schedule for the site. The irrigation schedule is based on the weather data and the boundary condition parameters. Any appropriate irrigation schedule algorithm may be used by various embodiments. One such irrigation schedule algorithm uses a modified Hargreaves calculation, as described in more detail with respect to FIG. 5. However, the scope of embodiments is not limited to Hargreaves-type algorithms.

At action 440, the host device communicates with an irrigation controller to cause the irrigation controller to open and close a plurality of water valves at the site according to the irrigation schedule. Specifically, the host device communicates with the irrigation controller according to a communication protocol associated with the irrigation controller. In some examples, the irrigation controller has a remote control input and communicates using a proprietary protocol. In such examples, the host device includes a wired interface appropriate for the remote control input and also has in its memory program code to allow it to communicate according to the proprietary protocol. In response to the received remote control signals, the irrigation controller uses its own electrical signals to open and close the water valves at the various zones according to the irrigation schedule.

In some instances, the host device is operable to recognize an irrigation controller when it is plugged into a remote control input of the irrigation controller. In such embodiments, the host device includes computer code executable by its microprocessor to recognize communication protocols of a variety of different irrigation controllers. The host device may recognize that its output has been plugged into a remote control input of an irrigation device, and it may poll the irrigation device to cause it to output information. The host device then compares that information to known communication protocols to be able to identify the type of irrigation device. The host device may then move forward using the identified communication protocols to control the irrigation controller.

The scope of embodiments is not limited to the specific method shown in FIG. 4. Other embodiments may add, omit, rearrange, or modify one or more actions. For instance, some embodiments may include the host device communicating with the central server to transmit data back to the central server, where that data includes operating and weather information. Such actions are described above with respect to transmitting changed data from the host device memory to the central server. Such actions are also described in more detail with respect to FIG. 5.

Figure 5:
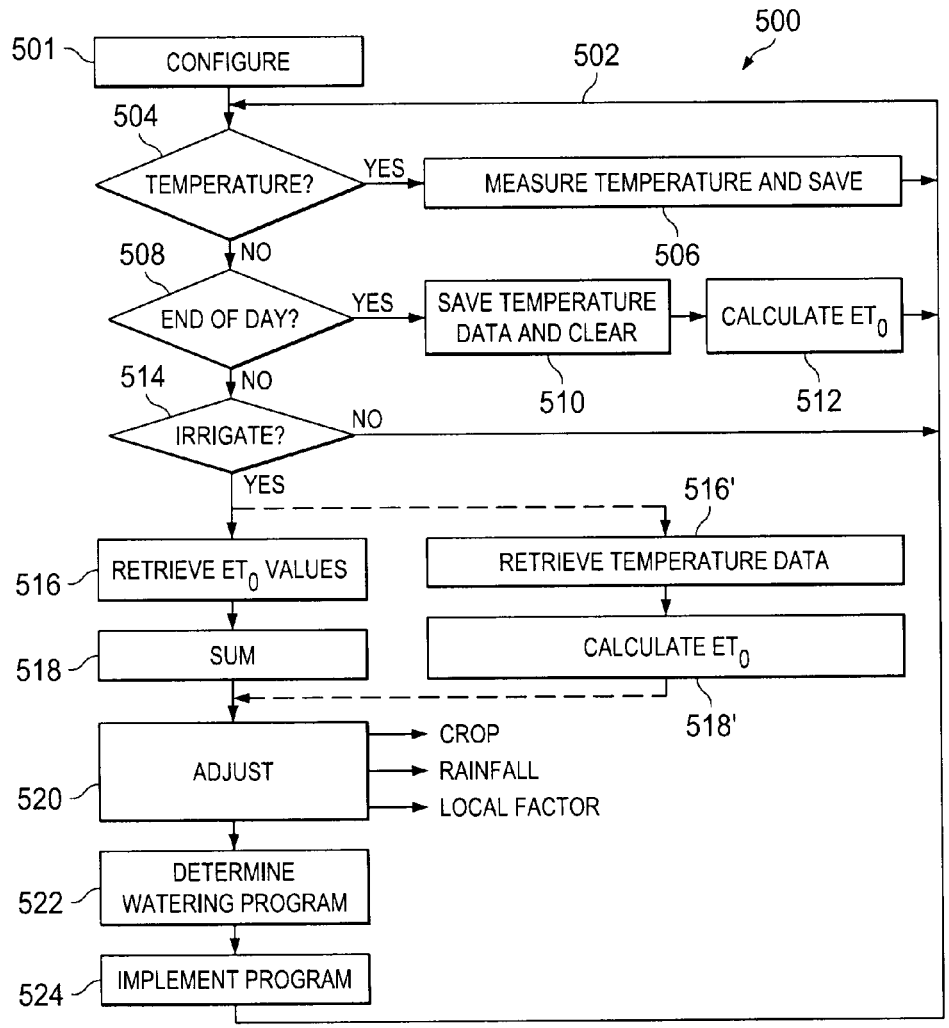
FIG. 5 is another illustration of an example method performed by the host device in the irrigation system, according to one embodiment.

A flow diagram of an example method 500 of operating a host device is illustrated in FIG. 5. The actions of FIG. 5 are performed by a microprocessor of a host device, such as the microprocessor 110 of host device 100 of FIG. 1. The microprocessor perform such actions by reading computer program code from a computer-readable medium executing that code.

Method 500 of FIG. 5 is similar to method 400 of FIG. 4, but the discussion of FIG. 5 includes more detail about a particular algorithm to generate irrigation schedules using a modified Hargreaves equation. It should be understood that FIG. 4 and FIG. 5 are different ways of expressing certain aspects of the operation of a given host device, according to some embodiments. Also, some embodiments may use algorithms other than a Hargreaves algorithm by adapting the method of FIG. 5 to such other algorithm.

In this embodiment, the programming code for the host device 100 is designed to implement the Hargreaves equation for calculating a reference evapotranspiration value based on 1) daily temperature and 2) equivalent evaporation based on extraterrestrial radiation at the latitude of the site where the host device 100 and weather station are installed. This reference evapotranspiration value represents an estimation of the watering needs of a certain reference vegetation at the site. This reference evapotranspiration value is then adjusted to account for the specific type of vegetation at the site, rainfall, and local factors specific to the site which affect evapotranspiration rates. The resulting evapotranspiration value represents an estimation of the watering needs for the specific plants at that specific site. A watering time is then calculated from the resulting evapotranspiration value and sprinkler average precipitation rates to determine how long the irrigation system in each zone of the site must be actuated to replace lost water At action 510, the user (e.g., a human user) configures the host device 100 by inputting certain information such as: 1) an irrigation schedule (day and time of day when irrigation should occur); 2) type of soil at the site; 3) average precipitation rate for the sprinklers in each zone; 4) latitude of the site; 5) type of vegetation at the site (crop coefficient); and 6) a local adjustment factor which accounts for a local presumed average variation between the Hargreaves equation calculated evapotranspiration value for the site and either (1) actual watering needs (evapotranspiration) at the site or (2) Penman-Monteith, modified Penmans or other similar evapotranspiration equation calculated evapotranspiration value for the site. According to the embodiment of FIGS. 2 and 3, the user may enter this boundary condition information into a user interface at a mobile computing device, where the mobile computing device transmits that data to the central server. The central server then downloads boundary condition parameters to the host device 100, as described above. However, in some embodiments the host device 100 itself may include an interface or communication port configured to allow a user to enter the information directly into the memory 103 of the host device 100.

Next, the method 500 enters a loop (generally indicated at 502) for controlling irrigation operation. In step 504, host device 100 determines whether it is time to collect temperature data. This determination may be based upon a set schedule for temperature measurement (for example, certain times of the day), or upon a periodic measurement procedure (for example, once every thirty minutes each day). Clock supplied information (e.g., by clock 104 of FIG. 1) may be used to trigger a temperature measurement. If yes in step 504, the process makes (and perhaps stores) a temperature measurement in step 506 and returns to the top of the loop 502. Temperature data is read by the microprocessor of the host device from the weather station 210 and saved in the RAM at memory 103 if it is either 1) higher than a currently stored high for the day, or 2) lower than a currently stored low for the day. The process then returns to the top of the loop 502.

If no in step 504, the process next determines in step 508 whether it is the end of the day (i.e., midnight). This determination is made by the microprocessor of the host device reading the clock of the host device. If yes in step 508, step 510 is executed to save the currently stored high and low temperatures into a temperature record for that expired day, and the currently stored high and low temperatures are reset. Thus, for each passing day, the RAM in the memory 103 of host device 100 stores a record of the measured high and low temperatures for that day. As an example, a first in, first out (FIFO) queue may be maintained in the RAM of memory 13 for storing the daily high and low temperatures. This queue may be of any selected and supported size, and in some embodiments has a size of at least thirty-one records in order to store a month's worth of temperature data.

In a first implementation of the process, following the temperature saving action of step 510, the process next calculates and saves in step 512 a reference evapotranspiration value for that day. The stored daily high and low temperature data from that day is extracted from memory and processed to provide high, low and differential temperature values. The extraterrestrial radiation influenced equivalent evaporation data for that day at the user input latitude for the controller site is also extracted from either a monthly or daily estimate table stored in the RAM at memory 103. The high, low and differential temperature values and equivalent evaporation data are then processed to calculate the reference evapotranspiration value for that day in accordance with the Hargreaves equation. The process then returns to the top of the loop 502. As an example, a first in, first out (FIFO) queue is maintained in the RAM at memory 103 for storing the daily evapotranspiration values. This queue may be of any selected and supported size, and in some embodiments has a size of at least thirty-one records in order to store a month's worth of evapotranspiration data.

If no in step 508, the host device 100 next determines in step 514 whether it is time to irrigate. This determination is made by the microprocessor reading the clock to compare the month/day/time to the user input irrigation schedule. If no in step 514, the process then returns to the top of the loop 502. If yes in step 514, the host device 100 retrieves in step 516 the stored reference evapotranspiration values for each preceding day since a last irrigation event. These retrieved values are then summed in step 518 to produce a total reference evapotranspiration value which represents an estimation of the current watering needs of a certain reference vegetation at the site. In a second implementation of the process, step 512 above is skipped, and if yes in step 514, the stored high and low temperature data for each day since a last irrigation event are retrieved in step 516'. These retrieved values providing high, low and differential temperature values are then processed, along with equivalent evaporation data, in step 518' to calculate the reference evapotranspiration value for each day in accordance with the Hargreaves equation, with the daily values since a last irrigation event summed to produce a total reference evapotranspiration value which represents an estimation of the current watering needs of a certain reference vegetation at the site.

Next, in step 520, the host device 100 adjusts the total reference evapotranspiration value to account for the type of vegetation at the site (a boundary condition), any measured rainfall (derived from weather station data) and local factors specific to the site which affect evapotranspiration rates. The resulting net evapotranspiration value represents an estimation of the current watering needs for the specific plants at that specific site.

As an example of this step 520 adjustment, the host device multiplies the reference evapotranspiration value by the user input local adjustment factor. In this regard, it is recognized that the Hargreaves equation is not always adequately precise at some sites, and the local adjustment factor accounts for a local presumed average variation between the Hargreaves equation calculated evapotranspiration value for the site and either (1) actual watering needs (evapotranspiration) at the site or (2) an estimated Penman-Monteith, modified Penmans or other similar evapotranspiration equation calculated evapotranspiration value for the site.

As another example of this step 520 the host device multiplies the locally adjusted reference evapotranspiration value by the user input crop coefficient to tailor the value to the specific vegetation at issue. This adjustment is made on a zone-by-zone (or program-by-program) basis as it is possible that different zones under the influence of a single controller may be populated with different types of vegetation. Thus, a certain crop coefficient may be applied for one zone which is populated by turf grass, and another crop coefficient may be applied to another zone which is populated by shrubbery. As yet another example of this step 520 adjustment, a measured amount of rainfall since a last irrigation time is subtracted from the locally adjusted and/or crop adjusted reference evapotranspiration value. The result of this step 520 adjustment is the generation of a net evapotranspiration value.

In step 522, the host device determines a watering program for the site. This program executed by the host device 100 takes into account not only the calculated resulting net evapotranspiration value, but also the average precipitation rates of the sprinkler(s) in each zone and the type of soil. The calculated resulting net evapotranspiration value comprises an amount of water to be applied (in inches or other equivalent metric standard) for each zone. A watering time for each zone is determined by dividing the calculated resulting net evapotranspiration value for the site/zone by the average precipitation rate (in inches/hour or other equivalent metric standard) for the sprinklers in each zone (or program) to determine how long the irrigation system in each zone (or program) of the site must be actuated to replace lost water. The program further specifies whether this watering time in each zone (or program) should be measured over a single application period or divided out over a plural number of application periods. This determination is made based on soil type in the zone as multiple application periods should be utilized with soils (like clays) having a low intake rate, and a single application period is suitable for soils (like sands) having a high intake rate. The soil type determination may also (or alternatively) take into account the surface contour (i.e., terrain conditions) for the soil of each zone (or program) as multiple application periods should be utilized with highly contoured (for example, hilly) zones subject to run-off concerns, and a single application period is suitable for flat contoured zones.

Next, in step 524, the determined watering program is implemented by host device 100. This implementation is made on a zone-by-zone (or program-by-program) basis so that each zone (or program) receives the proper amount of irrigation for replacing lost water. In some embodiments, step 524 may be carried out by the host device 100 sending remote control signals to an irrigation controller at the site, thereby causing the irrigation controller to issue its own electrical signals to actuate water valves at the one or more zones according to the irrigation schedule. Sprinkler head-by-sprinkler head implementation of the watering program may also be made in some embodiments, where the sprinkler heads may be individually actuated.

In situations where the on-site weather station detects moisture (such as from a rain storm) concurrent with the implementation of the watering program, the actions of step 524 are suspended pending the next step 514 determination to irrigate. Furthermore, in situations where the weather station measures a current temperature that is less than a certain value (indicative of a possible freeze or frost condition) the actions of step 524 are suspended pending the next step 514 determination to irrigate. The process then returns to the top of the loop 502.

The scope of embodiments is not limited to the specific actions shown in FIGS. 4 and 5. In fact, other embodiments may include further advantageous features that can be implemented along with the functionality described with respect to FIGS. 4 and 5. For instance, in one example, the host device 110 of FIGS. 1 and 2 is in communication with a flow sensor that is installed at or near the site flow meter or at a master valve of the site. This on-site flow sensor is in communication with the host device 110 using either wired or wireless techniques. For example, a simple two-wire interface may be used between the on-site flow sensor and the host device 110, or a wireless interface such as a 900 MHz wireless may be used to pass data between the flow sensor and the host device 110.

As noted above, the host device 110 controls an irrigation controller (e.g., controller 213 of FIG. 2), thereby causing the irrigation controller to open and close either individual valves or multiple valves associated with a zone. When the host device 110 causes a valve or multiple valves associated with a zone to open, it communicates with the flow sensor to receive a series of messages or signals from the flow sensor. The host device 110 includes logic to convert those signals into an appropriate flow measurement, such as gallons per minute by using pre-programmed mathematical models.

This provides a real-time flow that is specific to either an individual valve or an individual zone. This also provides an indication of the total site flow during that operating period of the individual valve or zone. Such technique can be performed for multiple individual valves or individual zones (e.g., zone by zone as a series of zones) to provide a comprehensive picture of water use during irrigation. Of course, since the flow sensor is installed at or near the site flow meter or master valve, the flow that it senses is water use for the site, which may include non-irrigation uses as well. Algorithms can be used to differentiate between irrigation water use and non-irrigation water use. For example, if no irrigation is being performed, but the flow meter senses a particular amount of flow immediately before opening a valve, then water use for that valve may be calculated by subtracting the subsequent flow rate from the amount sensed immediately before opening the valve. However, various embodiments may include any appropriate algorithm for measuring flow.

The host device 110 calculates real-time flow specific to a zone or individual valve, total flow for an operating period by valve or zone, and combined totals for a specified time (e.g., a day) and, when appropriate, transmits that information to a central server, such as server 264 of FIG. 2. Either the host device 110 or the central server 264 may then generate any high or low flow alerts and provide those alerts in real time to a user or caretaker of the site. A high or a low flow may indicate a malfunction at a particular valve or zone, and when the system detects a high or low flow event for a particular valve for zone, then it may skip that valve or zone in the calculated irrigation schedule until it receives input either erase seeing the alert from memory or indicating that a malfunction has been repaired.

Of course, providing a host device 110 with real-time flow sensing for a site may allow for other functionality to be implemented. In one example, the host device 110 may keep track of water use for the site (both for irrigation and non-irrigation) against a water budget and provide alerts when flow either exceeds the water budget or comes in low compared to the water budget. Specifically, the irrigation flow control and monitoring algorithms described in U.S. Pat. No. 7,930,069 may be performed by a host device 110 in communication with an on-site flow measuring device (the teaching of U.S. Pat. No. 7,930,069 is incorporated in its entirety herein).

Various embodiments may provide one or more advantages over some conventional systems. The embodiment of FIG. 2 is a retrofit solution that adds a host device 100 to an existing irrigation system, so that the advanced features of the host device 100 may be realized. The user does not have to completely replace the existing irrigation system, but rather uses an existing remote control input of the irrigation system to receive remote control signals from the added host device 100.

Furthermore, the embodiment shown in FIG. 2 includes a weather station, a host device, and an irrigation controller all located at the site that is being irrigated. This may allow for more precise measurements of evapotranspiration and water deficits for that particular site, which may prevent water waste by allowing the system to use an efficient irrigation schedule appropriate for that particular site. This may also allow for the device to continue updating irrigation schedules based on measured weather conditions, even without an Internet connection to a central server.

Moreover, various embodiments provide for transmitting weather data and operational data from the host device to the central server by transmitting changed data while not transmitting data that stays the same (compared to a previous reporting period). Such embodiments may transmit much less data over a longer period of time, thereby lowering operating costs.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
 a site-based computing device having:
  a first communication interface configured for communicating with a site-based weather station at a same site as the computing device, the site-based computing device configured for receiving weather data from the site-based weather station via the first communication interface;
  a computer processor configured for receiving the weather data and generating an irrigation schedule for the site based on the weather data and boundary conditions for the site; and
  a second communication interface configured for communicating with an irrigation controller at the site, the computer processor configured to control irrigation valves at the site, via the second communication interface, and according to the irrigation schedule;
 wherein the computer processor is configured to store signaling protocols for a multitude of different irrigation controllers, further wherein the computer processor is configured to recognize a type of the irrigation controller at the site from the multitude of different irrigation controllers by causing the irrigation controller at the site to output information and then comparing that information to the stored signaling protocols.

2. The system of claim 1, wherein boundary conditions include at least one of the following parameters: plant type in an irrigation zone, soil type in an irrigation zone, and sprinkler type in an irrigation zone.

3. The system of claim 1, wherein the first communication interface comprises a 900 MHz wireless interface.

4. The system of claim 1, wherein the site comprises commercial real estate having a single address.

5. The system of claim 1, wherein the site-based computing device further has a third communication interface configured for communicating over the Internet with a server computer.

6. The system of claim 5, wherein the computer processor is operable to receive the boundary conditions for the site over the Internet via the server computer.

7. The system of claim 5, wherein the third communication interface is configured for communicating over a cellular network with the server computer.

8. The system of claim 1, wherein the computer processor includes a memory having a memory map defined for a plurality of data points, each of the data points corresponding to an irrigation parameter of the site.

9. The system of claim 8, wherein the computer processor is configured to transmit to a server ones of the data points that have changed since a previous transmission to the server while omitting transmitting to the server ones of the data points that have not changed since the previous transmission to the server.

10. A method performed by a site-based computing device in communication with a physical weather station at the same site and an irrigation controller at the same site, the method comprising:
communicating with the weather station using a first communication interface to receive weather data for the site;
communicating with a server over the Internet to receive boundary condition parameters regarding the site;
generating an irrigation schedule for the site based on the weather data and the boundary condition parameters, wherein the generating is performed using a computer processor of the site-based computing device; and
communicating with the irrigation controller to cause the irrigation controller to open and close a plurality of water valves at the site according to the irrigation schedule and according to a communication protocol associated with the irrigation controller, the method further comprising storing signaling protocols for a multitude of different irrigation controllers and recognizing a type of the irrigation controller from the multitude of different irrigation controllers by causing the irrigation controller to output information and then comparing that information to the stored signaling protocols.

11. The method of claim 10, further comprising:
storing irrigation parameters of the site in a memory map of the computer processor;
in response to determining that it is a time period for communicating at least some of the irrigation parameters, transmitting ones of the irrigation parameters to a server over the Internet, and omitting transmitting ones of the irrigation parameters that have not changed since a prior transmission.

12. The method of claim 10, further comprising:
communicating with an on-site water flow meter to receive data indicative of water flow at the site; and
calculating a real-time flow specific to a particular zone of the site or a particular valve of the site.

13. The method of claim 10, wherein communicating with the server comprises transmitting and receiving information over the Internet using a wireless access point located at the site.

14. The method of claim 10, wherein generating an irrigation schedule comprises employing a modified Hargreaves algorithm.

15. The method of claim 10, wherein boundary conditions include at least one of the following parameters: plant type in an irrigation zone, soil type in an irrigation zone, and sprinkler type in an irrigation zone.

16. An irrigation system located at a site to be irrigated, the irrigation system comprising:
means for communicating with an on-site physical weather station using a first communication interface to receive weather data for the site;
means for communicating with a server over the Internet to receive boundary condition parameters regarding the site;
means for generating an irrigation schedule for the site based on the weather data and the boundary condition parameters; and
means for communicating with the irrigation controller to cause the irrigation controller to open and close a plurality of water valves at the site according to the irrigation schedule and according to a communication protocol associated with the irrigation controller;
wherein the means for generating is configured to store signaling protocols for a multitude of different irrigation controllers, further wherein the computer processor is configured to recognize a type of the irrigation controller from the multitude of different irrigation controllers by causing the irrigation controller at the site to output information and then comparing that information to the stored signaling protocols.

17. The irrigation system of claim 16, wherein the means for communicating with the server comprises a cellular data wireless interface.

18. The irrigation system of claim 16, wherein the means for communicating with the weather station comprises a 900 MHz wireless transceiver.

19. The irrigation system of claim 16, wherein the means for generating the irrigation schedule comprises a microprocessor in communication with a memory for storing computer executable code, the microprocessor operable to execute the computer executable code and to generate the irrigation schedule according to the computer executable code.

* * * * *